(12) United States Patent
Periyaeluvan et al.

(10) Patent No.: US 11,665,132 B2
(45) Date of Patent: May 30, 2023

(54) CLIENT-SERVER CONNECTIONS OVER WIDE AREA NETWORK

(71) Applicant: SLING MEDIA PVT LTD, Bangaluru (IN)

(72) Inventors: Rakesh Eluvan Periyaeluvan, Madurai (IN); Gopikumar Ranganathan, Madurai (IN)

(73) Assignee: DISH Network Technologies India Private Limited

( * ) Notice: Subject to any disclaimer, the term of this patent is extended or adjusted under 35 U.S.C. 154(b) by 35 days.

(21) Appl. No.: 16/414,660

(22) Filed: May 16, 2019

(65) Prior Publication Data

US 2020/0213273 A1 Jul. 2, 2020

Related U.S. Application Data

(60) Provisional application No. 62/786,853, filed on Dec. 31, 2018.

(51) Int. Cl.
*H04L 61/2567* (2022.01)
*H04L 9/40* (2022.01)
*H04L 67/141* (2022.01)
*H04L 61/45* (2022.01)

(52) U.S. Cl.
CPC ......... *H04L 61/2567* (2013.01); *H04L 61/45* (2022.05); *H04L 63/029* (2013.01); *H04L 67/141* (2013.01)

(58) Field of Classification Search
None
See application file for complete search history.

(56) References Cited

U.S. PATENT DOCUMENTS

| | | | |
|---|---|---|---|
| 7,795,062 B2 | 9/2010 | Taussig et al. | |
| 8,149,851 B2 | 4/2012 | Asnis et al. | |
| 8,171,148 B2 | 5/2012 | Lucas et al. | |
| 8,626,879 B2 | 1/2014 | Dham et al. | |
| 8,799,485 B2 | 8/2014 | Rao et al. | |
| 9,178,923 B2 | 11/2015 | Paul et al. | |
| 2008/0225866 A1* | 9/2008 | Sehgal | H04L 69/167 370/401 |
| 2011/0196521 A1 | 8/2011 | Jain et al. | |

(Continued)

*Primary Examiner* — Kevin T Bates
*Assistant Examiner* — Dae Kim
(74) *Attorney, Agent, or Firm* — KW Law, LLP (57) ABSTRACT

Server devices operating on the Internet or another wide area network (WAN) are able to locate client devices using address information obtained from a shared location. Client devices initially determine their own network address information and submit the determined information for a priori storage at the shared location on the WAN. Each server device, in turn, contacts a message service or the like to establish a persistent data connection that is maintained between the message service and the server device over time. After the client device stores its own address information, the client initiates contact with the server via the message service having the previously-established persistent connection. Upon receipt of the instruction from the message service, the server is able to retrieve the client's previously-stored address information from the WAN storage and use the information to establish a connection with the client.

17 Claims, 2 Drawing Sheets

(56) References Cited

U.S. PATENT DOCUMENTS

| | | | |
|---|---|---|---|
| 2013/0244614 A1* | 9/2013 | Santamaria | H04W 12/069 |
| | | | 455/411 |
| 2013/0340050 A1* | 12/2013 | Harrison | H04N 21/812 |
| | | | 726/4 |
| 2015/0113110 A1* | 4/2015 | Shimakawa | H04L 61/2575 |
| | | | 709/223 |
| 2015/0117264 A1* | 4/2015 | Kuo | H04L 65/4084 |
| | | | 370/255 |
| 2017/0272316 A1* | 9/2017 | Johnson | H04L 67/141 |
| 2018/0139131 A1* | 5/2018 | Ignatchenko | H04L 69/16 |
| 2021/0029078 A1 | 1/2021 | Ramaraj et al. | |

* cited by examiner

FIG.1

CLIENT-SERVER CONNECTIONS OVER WIDE AREA NETWORK

PRIORITY CLAIM

This application claims priority to United States Provisional Patent Application Ser. No. 62/786,853 filed Dec. 31, 2018 and incorporated herein by reference.

TECHNICAL FIELD

The following discussion generally relates to establishing connections between client and server devices over a wide area network. Various embodiments may be used in connection with media players, placeshifting devices, digital video recorder (DVR) devices, video game players and/or any other devices that interoperate with other devices using a digital network.

BACKGROUND

Viewers now obtain television and other media content from a wide array of devices and sources. Media streaming is increasingly replacing broadcast television, for example, and time and place shifting devices are becoming increasingly common in homes, offices and other settings. The digital video recorder (DVR), for example, allows television viewers to record television programming or other content for viewing at a later time. Place shifting devices allow live and/or pre-recorded programs to be encoded for efficient delivery over local and/or wide area networks for viewing on a phone, tablet, computer or other device at a remote location from the place that the content is received or stored. Additionally, video game players and other media devices are becoming increasingly commonplace in homes and other settings.

Although modern media systems can provide highly-convenient content for viewers, it is a continual challenge to establish connections between client and server systems operating over the Internet or another wide area network (WAN). In particular, security devices such as firewalls, routers, gateways and the like can block network traffic that various devices use to interconnect with each other. Connections to home-type server devices such as placeshifting devices, video streamers and the like can present substantial challenges because many home-type routers prevent incoming connections to servers located on the home network. Reconfiguring the home router to allow incoming connections can be a substantial challenge to many home users. Additionally, opening the home network to incoming connections can present security challenges.

It is therefore desirable to create devices, systems and processes to effectively yet securely establish connections between clients and servers on the Internet or other wide area networks. Other desirable features and characteristics will become apparent from the subsequent detailed description and the appended claims, taken in conjunction with the accompanying drawings and this background section.

BRIEF DESCRIPTION

Various embodiments relate to different automated processes, computing systems, devices and other aspects of a data processing system that provides connectivity between client and server devices, particularly when the server device is separated from the client device by a firewall or similar barrier to network connectivity.

In one example, client devices initially determine their own network address information (e.g., internet protocol (IP) addresses used to contact the device) and submit the determined information a priori storage on the WAN. Each server device, in turn, contacts a message service or the like to establish a persistent data connection that is maintained between the message service and the server device over time. After the client device stores its own address information, the client initiates contact with the server via the message service. That is, rather than contacting the server directly, the client contacts the message service to request an incoming message from the server. The message service forwards the request to the server via the previously-established persistent connection.

After receiving the request for a connection via the persistent connection with the message server, the server device contacts the data storage service on the network to obtain the previously-stored address information about the client device. The server then uses the stored address information to establish an outgoing direct connection with the client device. The address information received from the data storage service can additionally and/or alternately be used to initiate network address translation (NAT) hole punching around those addresses, and/or for other connection techniques as desired. Because the server's attempts to contact the client device are outgoing connections from the standpoint of the server's router or other firewall device, the connections are likely to be allowed.

Various embodiments relate to automated processes executed by client and/or server devices. The processes may be implemented using programming instructions that are stored in memory or other storage, and that are executed by a processor or similar computing hardware.

Various examples provide an automated process executed by a client device to establish a connection with a server device via a wide area network. The automated process suitably comprises: determining, by the client device, address information comprising a plurality of addresses associated with the client device for communicating on the wide area network; transmitting, by the client device, the address information to a data storage server via the wide area network for storage of the address information in a database associated with the data storage server, wherein the address information is stored in the data base in association with an identifier of the client device; and after transmitting the address information to the data storage server, the client device subsequently transmitting a connection request message to a message server via the wide area network, wherein the connection request message comprises the identifier of the client device and a server identifier of the server device, and wherein the message server has a pre-existing persistent connection with the identified server device to thereby permit the message server to trigger the server device to establish the connection with the client device via the wide area network, and wherein the server device responds to the trigger from the message server by initially retrieving the address information associated with the identifier of the client device from the data storage server via the wide area network and then establishing an outgoing connection to the client device using at least one of the plurality of addresses in the retrieved address information.

Other embodiments provide an automated process executed by a server device separated from a client device via a router device that blocks incoming connections from a wide area network. The automated process suitably comprises: initially establishing a persistent connection from the server device to a message service via the wide area network, wherein the persistent connection is established as an outgoing connection from the server device to the message server and is maintained between the server device and the message server over time; receiving a trigger message from the message server via the persistent connection, wherein the trigger message identifies the client device; in response to the trigger message, the server device requesting address information associated with the identified client device from a data storage server via the wide area network, wherein the address information comprises a plurality of addresses associated with the client device for communicating on the wide area network; and after receiving the address information associated with the identified client, the server device establishing an outgoing connection to the client device using at least one of the plurality of addresses in the received address information.

Still other embodiments relate to a data processing system to facilitate online communications between a client device and a server device via a wide area network. The data processing system suitably comprises a data storage server and a message server each having a processor, a memory and an interface to the wide area network. The data storage server is programmed to receive address information from a plurality of client devices and to store the received address information in a database, wherein the address information for each client device comprises an identifier of the client device and a plurality of addresses used by the client device to communicate via the wide area network. The message server is programmed to receive incoming messages from a plurality of server devices, to respond to each of the incoming messages to establish a plurality of persistent connections with the server devices and to maintain the persistent connections over time, wherein the message server is further programmed to respond to subsequent communications from the client devices to transmit trigger messages to the server devices, wherein each of the trigger messages directs one of the server devices to establish an outgoing connection to an identified client device. Upon receiving one of the trigger messages, the server devices are programmed to initially contact the data storage server to retrieve the address information previously stored in the database for the identified client device and to use the retrieved address information to establish the outgoing connection from the server device to the client device.

Other embodiments relate to client and/or server devices each having a processor, memory or other digital storage, and an interface to a digital network. Software, firmware or other programming instructions to perform various functions are stored in the digital storage for execution by the processor.

DETAILED DESCRIPTION

The following detailed description is intended to provide several examples that will illustrate the broader concepts that are set forth herein, but it is not intended to limit the invention or the application and uses of the invention. Furthermore, there is no intention to be bound by any theory presented in the preceding background or the following detailed description.

Figure 1:
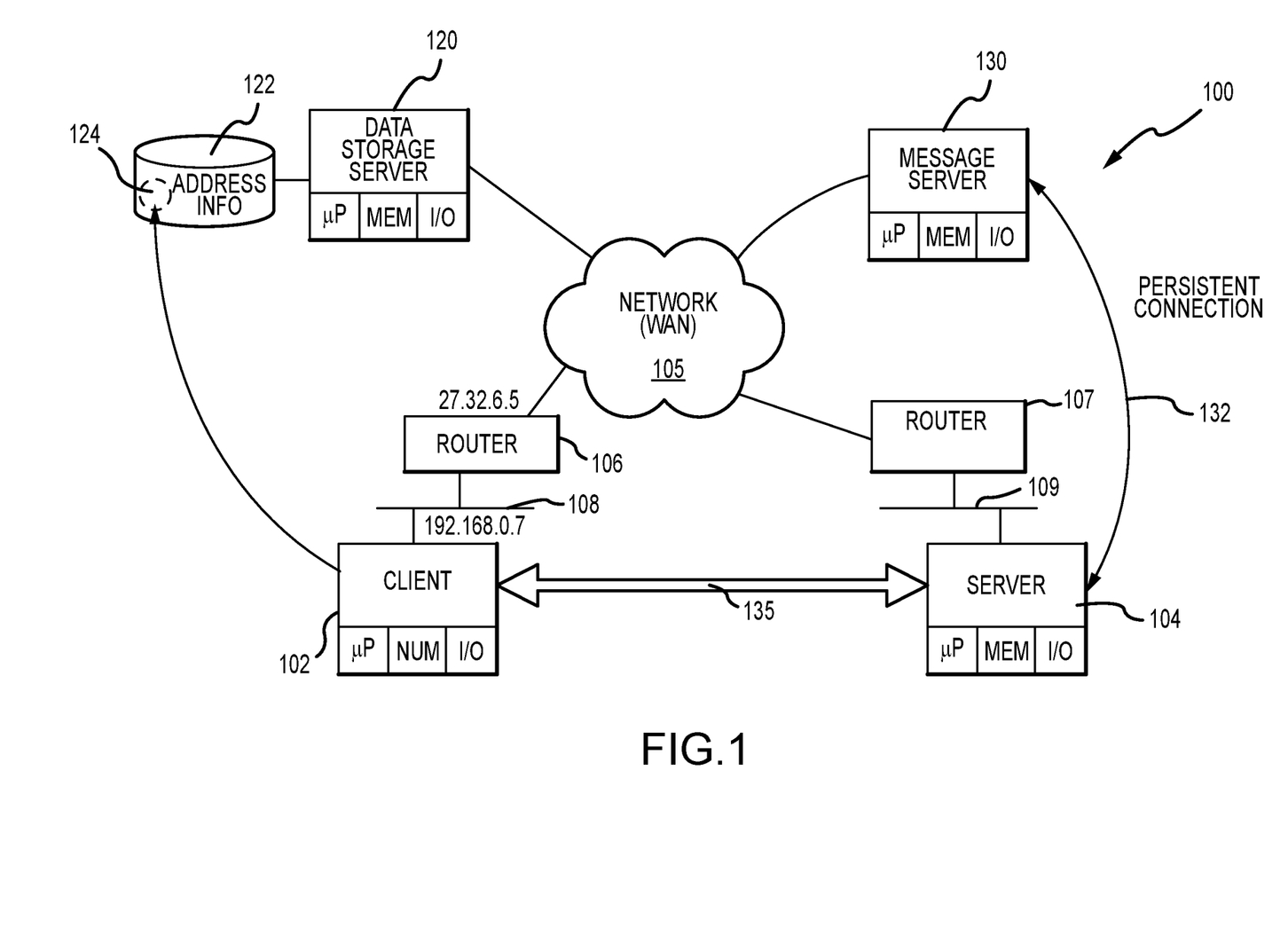
FIG. 1 illustrates an example of a system to establish a connection between a client device and a server device via a wide area network.

In various embodiments, a client device 102 attempts to locate and contact a server device 104 that resides behind a firewall or similar logical barrier 107 to establish a connection 135 via network 105. The server device may provide video streams to the client, such as time and/or place shifted video, video on demand and/or the like.

Often, routers, gateways or other devices 107 provide logical firewalls that can prevent direct incoming connections from network 105. This is typically for security purposes to prevent unauthorized access to personal networks (e.g., LAN 109) from the outside Internet or another WAN. With normal router configuration, however, devices 104 operating on the internal network 109 are usually allowed to send outgoing messages to the network 105. Server 104 can therefore initiate outgoing connectivity with message server 130 on network 105 when it starts up, or at any other time. This outgoing connection can initiate the establishment and maintenance of a connection 132 that persists over time, as desired. Connection 132 may be maintained using, for example, TCP keepalive packets or the like. One example of a messaging service that maintains persistent connections with multiple devices is described in U.S. Pat. No. 9,015,225, which is incorporated herein by reference, although other embodiments could use different services or mechanisms as desired.

Client devices 102 can contact the messaging service 130 to request new connections from particular servers 104 that are in communication with the desired server 104. Often, clients 102 are "hard coded" or otherwise provided with a preexisting address (e.g., a URL or other identity) of a message service 130 on the WAN that can relay a message to the desired server 104 via a previously-established connection between the message service 130 and the server 104. This allows the server 104 to make an outgoing connection to network 105 through firewall 107, if indeed the server 104 can locate and communicate with the client device 102 that is requesting the connection.

Often, however, the server 104 is unable to contact the client device 102 due to network address translation issues relating to the client address, due to client-side firewalls 106 blocking direct connections to the client 102, and/or due to other issues. Network-based relay services have seen some success, but it is nevertheless desirable to allow client devices 102 and server devices 104 to establish direct connections 135 whenever possible. Direct connections 135 do not typically require an intermediary computer, so the cost of providing such services can be reduced (or even eliminated). As for the connection itself, the processing and transmission delays inherent in any intermediating relay service are eliminated, thereby allowing for more efficient communication between the client 102 and server 104. Direct connections may be more bandwidth efficient as well. One example of a relay service is described in U.S. Pat. No. 8,171,148, which is incorporated herein by reference, although other embodiments may consider other relay services, as desired.

To establish a direct connection over network 105, then, the client device 102 and the server device 104 typically need to (1) overcome any firewalls or other logical barriers that may impede direct communications; and (2) identify each other on the network using appropriate addresses. With regard to the first issue, a message service 130 or the like can be used to transmit messages to the desired server 104 via the persistent connection 132 previously established between the server 104 and service 130. To overcome the second issue, client devices 102 can discover their address information 124 and forward it for storage on a data storage server 120 on network 105. When the server 104 later attempts to contact the client device 102, the server 104 can retrieve the previously-stored address information from the server 120. Equivalently, the message service 130 (or another service with access to network 105) could obtain the relevant address information 124 on behalf of the server 104, as appropriate.

Address information for client 102 may vary from embodiment to embodiment. Client 102 may initially determine its IP (or similar) address on its local area network 108, for example, as well as its IP address and port number used on the external interface of router 106 for communication on WAN 105. Client 102 may determine additional addresses used by any intervening devices or networks, as desired. Although such information may be obtained in any manner, one embodiment could permit client 102 to execute a TRACEROUTE operation targeting a known service on network 105 (e.g., the messaging service, a video hosting service, or any other well known host on the WAN). The resulting information could be forwarded from client 102 to server 120 as network information 124 for storage in a database 122, as desired. Again, client 102 may determine its address information and forward the determined information to server 120 in any manner.

The particular address information 124 gathered by the client 102 and/or server 104 may vary, from embodiment to embodiment, as may the specific address formats and protocols may used. The examples described herein often refer to Internet Protocol (IP) addresses in the form of x.x.x.x. In practice, any other address formats (e.g., IPv6 or the like) could be equivalently used. Address information 124 could also include port numbers or similar constructs, as appropriate.

When the server 104 has obtained the address information 124 relating to the client, the server 104 suitably establishes outgoing connections to the relevant addresses in an attempt to connect to client device 102. In various embodiments, the server 104 attempts to BIND or otherwise connect to a known port on the destination address that is associated with a particular application. In other embodiments, server 104 uses network address translation (NAT) or similar techniques to attempt to contact the client 102, as desired. Several examples network mediation services and techniques are described in U.S. Pat. Nos. 8,149,851; 8,626,879; and 8,799,485, and in US Patent Publication No. 2011/0196521, all of which are incorporated herein by reference.

FIG. 1 shows an example of a system 100 in which a client 102 attempts to contact a server 104 via a wide area network 105. With reference to FIG. 1, the server device 104 establishes a persistent connection 132 to a message server 130 that can relay connection requests from client device 102 to server 104, as desired. Server 104 can respond to the connection request by obtaining previously-stored address information 124 from data storage server 120 on network 105 and then using the retrieved address information to establish an outgoing connection 135 to client 102 through firewall device 107 as desired.

Server device 104 may be any sort of network device having a processor, memory and input/output interfaces (e.g., a network interface), such as a streaming video source, a file server, a video game device, a time and/or placeshifting device, and/or the like. One example of a server device 104 in some implementations could be the AirTV Classic device that is available from tat; although equivalent embodiments could be used with any number of other DVRs, media receivers/players, video on demand (VOD) servers, set top boxes, video game consoles, time or place shifting devices and/or the like. U.S. Pat. No. 7,795,062 provides additional detail about several example place shifting devices and techniques. Equivalent concepts could be implemented in any number of other devices or systems.

Client device 102 is any device capable of communicating on network 105 to obtain data or services from server 104. In various embodiments, client device 102 is a mobile phone, tablet, computer and/or the like that interfaces with network 105 via an appropriate router, gateway or other device 106. Device 106 may be, for example, a mobile telephony gateway to the broader Internet. Equivalently, device 106 may be a home or office-type router that connects wired and/or wireless local area networks to WAN 105, as desired. Device 106 may provide firewall and other network security functions, as desired. Typically, device 106 will assign addresses and/or port numbers on an external interface associated with WAN 105 for each of the devices 102 operating on the internal side of device 106 (e.g., on LAN 108), as appropriate. Devices 102, 104, 106 and 107 are all computing devices having processing circuitry programmed to carry out the various functions described herein. Typically, the processors of such devices execute software or firmware instructions that are stored in a memory, solid state or magnetic drive and/or other non-transient storage device. Devices 102, 104, 106 and 107 also include network interface circuitry to communicate via local area networks (LANs), wide area networks (WANs), mobile telephony networks and/or other communications links that may be available. Such links may be provided via fiber or other wired connections (e.g., in the case of routers 106 and 107), while other links may be wireless telephony, network and/or other links, as desired.

Network 105 is any wide area network (WAN) such as the Internet, a telephony network, a public or private network of any sort, or the like. Network 105 may be based upon TCP/IP protocols, or any other protocols as desired. Networks 108 and 109 may be implemented as wired or wireless LANs, or any equivalent communications links. Such LANs may be built in accordance with IEEE protocols 802.3 and/or 802.11 in some implementations.

Figure 2:
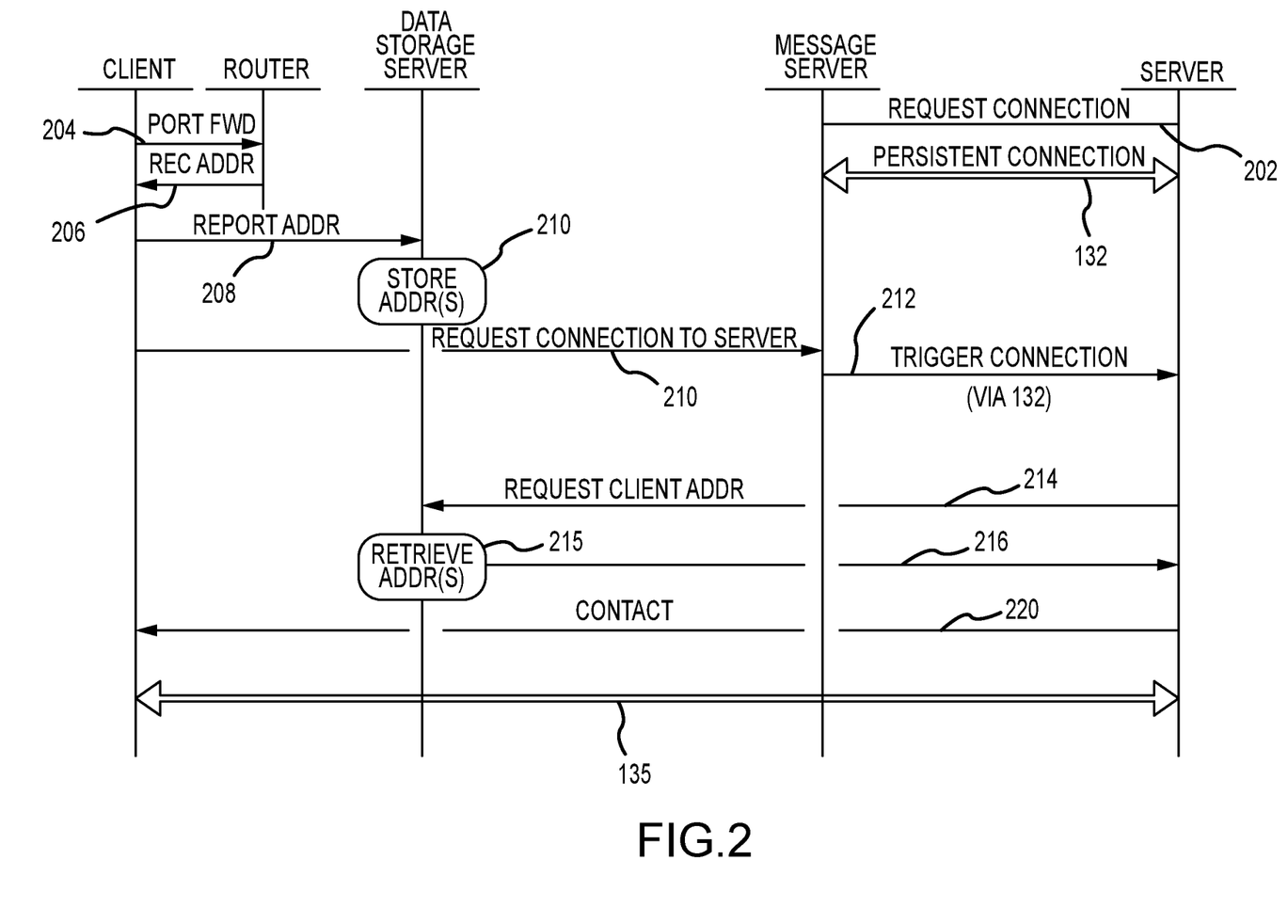
FIG. 2 is a diagram showing various example processes to establish connections between client and server devices via a wide area network.

FIG. 2 illustrates an example process 200 to establish a connection 135 between client device 102 and server device 104, although equivalent embodiments may modify the various functions and messages shown in FIG. 2 in any manner. Generally speaking, the various functions shown in FIG. 2 may be carried out in processing hardware (e.g., one or more microprocessors) residing within the appropriate device, system or service. Various embodiments may implement some of the functions (e.g., the functions associated with data storage provider 120 and message server 130) using "cloud" computing resources, such as the Amazon Web Services products or the like. Typically, the various functions are carried out by the processor executing software or firmware logic in any format that is stored in memory or other non-transitory storage prior to execution. Equivalent embodiments may operate in any other manner, as desired.

In the example of FIG. 2, server 104 appropriately establishes a persistent connection 132 with message server 130 prior to receiving client requests. To that end, server 104 suitably places an outgoing request 202 to the message server 130 that can be forwarded by router 107 to network 105. Request 202 may be triggered by startup of server 104 (e.g., by firmware executing in server 104), if desired. Since the request 202 is an outgoing request, it will typically be allowed by router 107, and any replies from message server 130 will typically also be allowed, since they are replies to request that initiated from the internal network. These communications can be used to establish a persistent TCP or other connection 132 that can be kept alive (e.g., using TCP "keepalive" packets) until the connection 132 is needed.

Client 102 initially obtains an address on its local network, and reports this address (along with any other appropriate address information) to data storage server 120. In various embodiments, client 102 initiates contact with router 106 to request an address and/or port number (function 204). The router returns the address information as appropriate (function 206). The address information returned may include an IP address on a local LAN (e.g., network 108). In various embodiments, client 102 also requests and receives a dedicated port number on the WAN interface of router 106, thereby allowing communications directed to that port to be forwarded to the client 102 on the internal network. This port number could, in turn, be part of the client's address information that is stored for future use by a server 104 attempting to establish an incoming connection to the client 102.

In various embodiments, client 102 takes other actions to identify any other address information that can be obtained. Client 102 may perform a traceroute analysis to a known address or URL on network 105, for example, to identify addresses and/or port numbers of other computing nodes that could relay messages to the client 102, or that could aid server 104 in locating client 102 on network 105. Other network information could be collected and stored by client 102, as desired.

The client device 102 suitably reports any of its address information 124 to data storage service 120, as appropriate (function 208). This report may be, for example, an XML or other formatted file that is placed with an appropriate web service using, for example, conventional HTTP "put" or "post" instructions sent to an appropriate URL on network 105. Address information may alternatively be sent using any other protocols or formats, as desired. Typically, the report will also include an identifier or other name of the client 102 to permit subsequent retrieval from database 122. Data storage service 120 suitably stores the received address information 124 in database 122 for subsequent retrieval (function 210).

When the client 102 later attempts to connect with server 104, it initiates the connection 135 by sending a connection request message 210 to the message server 130. Typically, message server 130 operates at a pre-existing and well-known address on network 105 that can be hardcoded into client 102, and/or that can be readily obtained by automatic or manual configuration of client 102, and/or that can be retrieved using domain name services (DNS) or other address resolution functions available via network 105. Message 210 is an outgoing message through router 106, so router 106 will typically allow the outgoing message proceed, and replies from message server 130 will also be allowed to return through router 106. The message 210 will typically contain a name or other digital identifier of the particular server 104 that is desired by client 102, as appropriate.

To facilitate replies to the outgoing message 210, router 106 will typically allow incoming messages at a particular port number that is associated with the outgoing request 210. This port number will generally be associated with an address on the WAN side of router 106 so that messages sent to that address and port number will be forwarded by router 106 to the requesting client 102 on LAN 108. This address and port number may be used, in some implementations, by server 104 to contact client 102.

Message server 130 may acknowledge request 210, if desired. To continue the connection process 200, message server 130 suitably responds to the connection request 210 by triggering a message to the server 104 via the previously-established persistent connection 132 (function 212). This message 212 will typically identify the client device 102 that is requesting the connection by name or digital identifier so that server 104 can request and obtain stored address information associated with that particular client 102.

To that end, server 104 typically responds to the trigger message 212 by contacting the address storage service 120 and requesting the address information 124 that is stored for the identified client 102 in database 122 (function 214). The data storage server 120 receives the request 214 and retrieves the relevant information for the identified client 102 from database 122 (function 215). The data server 120 then responds to the servers request 214 by sending a reply 216 that includes the requested address data for the identified client 102.

When server 104 has the relevant address data for the client 102 requesting the connection 135, then the server 104 can initiate outgoing contact with the appropriate address (function 220). Because this connection is outgoing, it will typically be allowed by router 107. Various embodiments may allow server 104 to make several outgoing connections to various addresses and/or port numbers that are obtained from the data storage server 120, as desired. Server 104 may also initiate NAT hole punching around one or more addresses, and/or take further actions as desired to establish connection 135 with the client 102. Server 104 may attempt to find the address and port number assigned by router 106 to the outgoing message 210, for example, using NAT hole punching or the like.

The process 200 therefore makes use of centralized address storage and multiple outgoing connections to improve connectivity between clients and servers. Clients 102 are able to locate themselves on the network 105 and provide beneficial address information to a central storage before requesting a connection (or at least at the same time as the connection is requested) so that the server 104 can obtain the information even though direct connections have not yet been established.

Further embodiments could expand the concepts herein so that the server additionally or alternately stored its address information with a service on the WAN so that the client could similarly initiate contact with the server at the server's last-known addresses. Put another way, although the figures and discussion generally describe the server as being located behind a firewall, equivalent concepts could be used to allow the server to contact client devices that are located behind firewalls as well. Returning to FIG. 1 for a further example, client 102 may initially attempt to gather its address information 124 through TRACEROUTE or other mechanisms. In the illustrated example, client 102 may be able to discover its address on the LAN 108 (e.g., 192.168.0.7 in the illustrated example), as well as a router address on LAN 108 (e.g., 192.168.0.1), an address on WAN 105 (e.g., 27.32.6.5 in the example of FIG. 1), as well as any other addresses used by client 102 for communications on network 105. Each of these addresses can be transmitted to server 120 for storage in database 122 and subsequent retrieval by the server 104 in response to messages that server 104 receives via its persistent connection 132. Server 104 may then try one or more of the addresses obtained to establish a connection. Even if none of the retrieved addresses are successful, the retrieved addresses may be used as starting points for NAT hole punching or other attempts to guess addresses and/or ports that can connect to client 102 behind router 106. These example concepts may be modified or enhanced in any manner across a wide array of alternate but equivalent embodiments.

The general concepts described herein could be expanded in any number of ways to address any number of different network connectivity issues relating to any types of client or server devices. Although the network environment is often described herein as a "home" environment, for example, equivalent concepts could be applied to offices, schools, factories, restaurants and bars, and/or any number of other environments that make use of multiple local area networks. Moreover, the concepts described herein with respect to contacting DVR or PVR video storage devices to establish video streaming could be equivalently applied for other applications or purposes, such as internet television (IPTV), video gaming, home or office control, file or print sharing and/or any other applications as desired.

The term "exemplary" is used herein to represent one example, instance or illustration that may have any number of alternates. Any implementation described herein as "exemplary" should not necessarily be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

What is claimed is:

1. An automated process executed by a media player device to establish a media streaming connection with a media server device via a wide area network, the automated process comprising:
    determining, by the media player device, address information comprising a plurality of addresses associated with the media player device for communicating on the wide area network, wherein the address information comprises a first address used by the media player device on a local area network and a second address used by the media player device on the wide area network, and wherein the first address is assigned to the media player device by a router device that interconnects the local area network and the wide area network;
    transmitting, by the media player device, the address information to a data storage server via the wide area network for storage of the address information in a database associated with the data storage server, wherein the address information is stored in the data base in association with an identifier of the media player device; and
    after transmitting the address information to the data storage server, the media player device subsequently transmitting a connection request message to a message server via the wide area network, wherein the connection request message comprises the identifier of the media player device and a server identifier of the media server device that supplies the media stream, and wherein, prior to the connection request message, the message server has established a pre-existing persistent connection with the identified media server device via the wide area network that is maintained over time to thereby permit the message server to trigger the media server device via the pre-existing, persistent connection to establish the connection with the media player device via the wide area network, and wherein the media server device responds to the trigger from the message server by initially retrieving the address information associated with the identifier of the media player device from the data storage server via the wide area network and then establishing a plurality of outgoing media streaming connections directly to the media player device via the wide area network using the first and second addresses of the media player device retrieved from the data storage server in response to the trigger.

2. The automated process of claim 1 wherein the second address comprises a WAN address and a port number associated with the router device, wherein the WAN address identifies the router device on the wide area network and the port number is assigned by the router device to identify the media player device.

3. The automated process of claim 2 wherein the determining comprises the media player device executing a TRACEROUTE command to thereby identify the plurality of addresses associated with the media player device for communicating on the wide area network.

4. The automated process of claim 1 wherein the determining comprises the media player device executing a TRACEROUTE command to thereby identify the plurality of addresses associated with the media player device for communicating on the wide area network.

5. An automated process executed by a media server device separated from a media player device via a router device that blocks incoming connections from a wide area network, the automated process comprising:
    initially establishing a persistent connection from the media server device to a message service via the wide area network, wherein the persistent connection is established as an outgoing connection from the server device to the message server via the wide area network;
    maintaining, by the media server device, the persistent connection with the message service over time;
    subsequently receiving a trigger message from the message server via the previously-established persistent connection, wherein the trigger message identifies the media player device;
    in response to the trigger message received via the persistent connection with the message server, the server device requesting address information associated with the identified media player device from a data storage server via the wide area network, wherein the address information comprises a plurality of addresses associated with the media player device for communicating on the wide area network, wherein the media player device stored the address information with the data storage server prior to the trigger message, and wherein the address information comprises a first address used by the media player device on a local area network and a second address used by the media player device on the wide area network, and wherein the first address is assigned to the media player device by a router device that interconnects the local area network and the wide area network; and
    after receiving the address information associated with the identified media player device from the data storage server, the media server device establishing a plurality of outgoing media streaming connects directly to the media player device via the wide area network using the first and second addresses obtained in the received address information.

6. The automated process of claim 5 wherein the second address comprises a WAN address and a port number associated with the router device, wherein the WAN address identifies the router device on the wide area network and the port number is assigned by the router device to identify the media player device.

7. The automated process of claim 5 wherein the establishing comprises the server device transmitting a series of outgoing connection requests via the wide area network, wherein each of the series of outgoing connection requests is directed to one of the plurality of addresses associated with the media player device for communicating on the wide area network.

8. The automated process of claim 7 wherein, if each of the series of outgoing connection requests is unsuccessful, the server device attempting to contact the media player device using NAT hole punching directed toward at least one of the plurality of addresses associated with the media player device.

9. The automated process of claim 5 wherein the media server device is a digital video recorder (DVR) located in a home of a user, and wherein the media player device is a mobile phone operated by the user.

10. The automated process of claim 9 wherein the media server device is a media streaming device located in a home of a user, and wherein the media player device is a mobile phone operated by the user.

11. A data processing system to facilitate online media streaming communications between a media player device and a media server device via the Internet, the data processing system comprising:
a data storage server having a first processor and a first data storage, wherein the first processor is programmed to receive address information from a plurality of media player devices and to store the received address information in a database, wherein the address information for each media player device comprises an identifier of the media player device and a plurality of internet protocol (IP) addresses used by the media player device to communicate via the Internet, the plurality of IP addresses comprising a first address used by the media player device on a local area network and a second address used by the media player device on the wide area network, and wherein the first address is assigned to the media player device by a router device that interconnects the local area network and the wide area network; and
a message server having a second processor and a second data storage, wherein the second processor is programmed to receive incoming messages from a plurality of media server devices via the Internet, to respond to each of the incoming messages to establish a plurality of persistent connections with the server devices via the Internet and to maintain each of the persistent connections over time, wherein the message server is further programmed to respond to subsequent communications from the media player devices via the Internet to transmit trigger messages to the server devices via the previously-established persistent connections, wherein each of the trigger messages directs one of the server devices to establish an outgoing connection directly to an identified media player device via the Internet;
wherein, upon receiving one of the trigger messages via one of the previously-established persistent connections to the message server, the media server devices are each programmed to initially contact the data storage server via the Internet to retrieve the plurality of IP addresses previously stored in the database for the media player device identified in the trigger message and to use the plurality of retrieved IP address information to establish a plurality of outgoing media streaming connections from the media server device directly to the media player device via the Internet using the first and second addresses of the media player device.

12. The data processing system of claim 11 wherein the second address comprises a WAN address and a port number associated with the router device, wherein the WAN address identifies the router device on the Internet and the port number is assigned by the router device to identify the media player device.

13. The data processing system of claim 11 wherein the data storage server and the message server each comprise a hardware interface to the Internet.

14. An automated process executed by a media player device to establish a media streaming connection with a media server device via the Internet, the automated process comprising:
determining, by the media player device executing a TRACEROUTE command, Internet Protocol (IP) address information comprising a plurality of IP addresses associated with the media player device for communicating on the Internet, wherein the IP address information comprises a first IP address used by the media player device on a local area network and a second IP address used by the media player device on the Internet, wherein the first and second IP addresses are assigned to the media player device by a router device that interconnects the local area network and the Internet, wherein the second IP address comprises a WAN address and a port number associated with the router device, wherein the WAN address identifies the router device on the Internet and the port number is assigned by the router device to identify the media player device;
transmitting, by the media player device, the IP address information to a data storage server via the Internet for storage of the IP address information in a database associated with the data storage server, wherein the IP address information is stored in the data base in association with an identifier of the media player device; and
after transmitting the IP address information to the data storage server via the Internet, the media player device subsequently transmitting a connection request message to a message server via the Internet, wherein the connection request message comprises the identifier of the media player device and a server identifier of the media server device, and wherein the message server has a pre-existing persistent connection with the identified server device via the Internet to thereby permit the message server to trigger the server device via the pre-existing persistent connection via the Internet, and wherein the media server device responds to the trigger from the message server by initially retrieving the IP address information associated with the identifier of the media player device from the data storage server via the Internet and then initiating a plurality of media streaming connections as outgoing connections from the media server directly to the media player device via the Internet using the first and second IP addresses in the retrieved address information.

15. The automated process of claim 14 wherein the outgoing connection from the server device to the media player device is directed to the WAN address and port number associated with the router device.

16. The automated process of claim 15 wherein the outgoing connection form the server device is made directly to the WAN address and port number associated with the router device without contacting the message server.

17. The automated process of claim 15 wherein the plurality of outgoing connections further comprise connections to different addresses and port numbers determined using a network address translation (NAT) protocol.

* * * * *